G. F. CLAMER.
ELECTRIC SYSTEM FOR STORAGE AND MEASUREMENT OF GASOLENE.
APPLICATION FILED JULY 19, 1918.
1,338,814. Patented May 4, 1920.
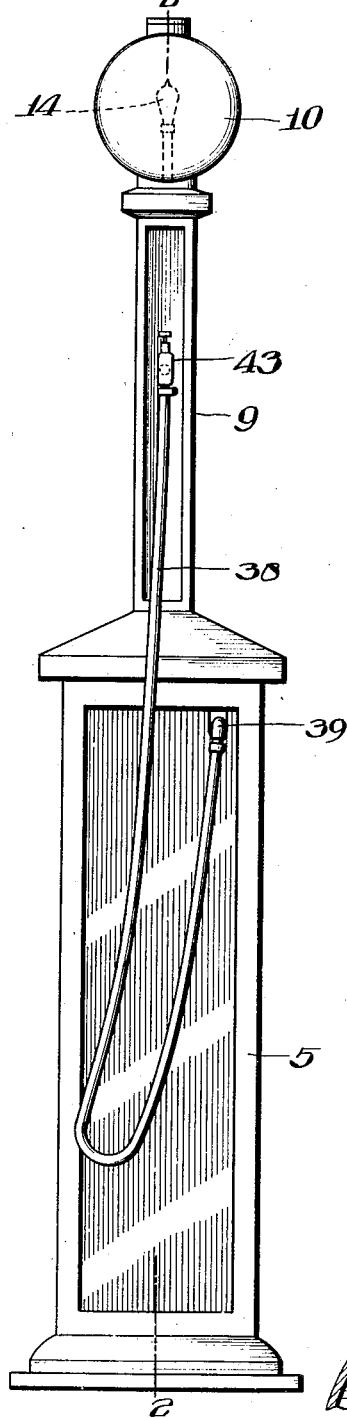
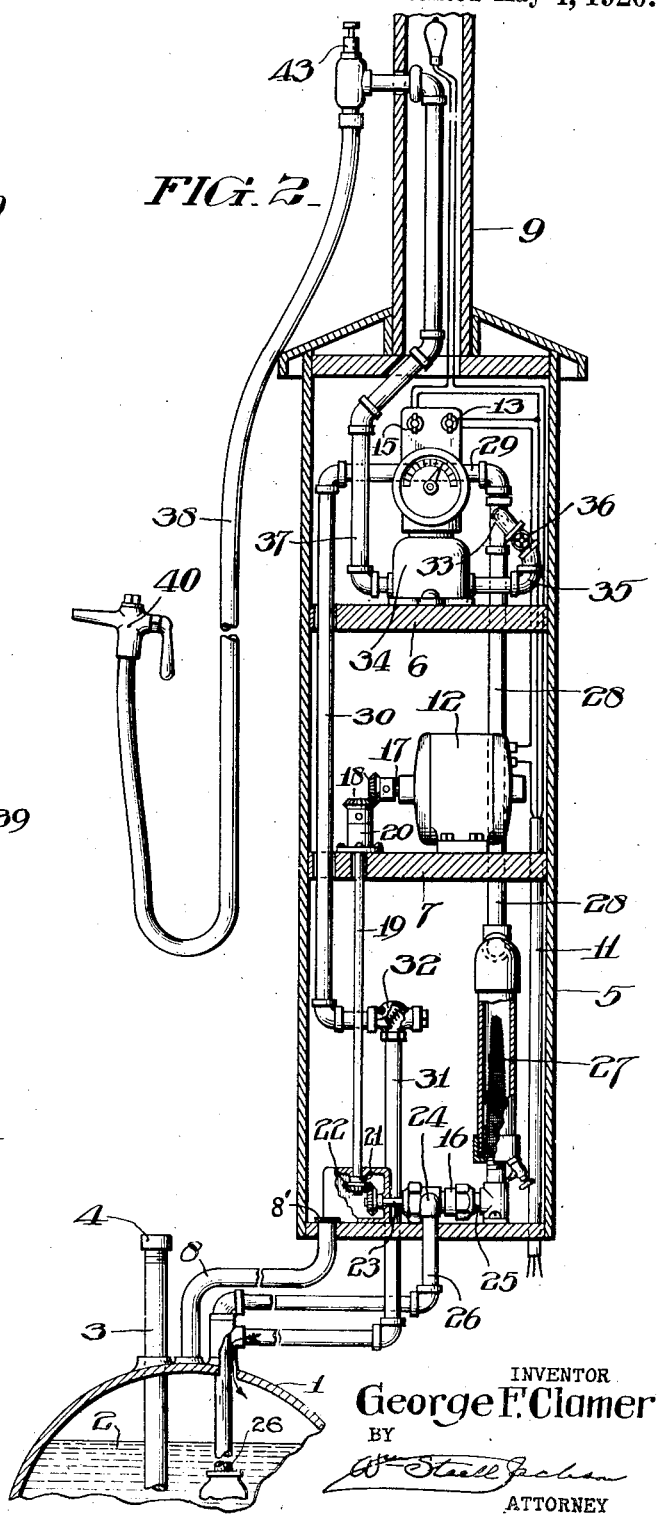
INVENTOR
George F. Clamer
BY
ATTORNEY

UNITED STATES PATENT OFFICE.

GEORGE F. CLAMER, OF COLLEGEVILLE, PENNSYLVANIA.

ELECTRIC SYSTEM FOR STORAGE AND MEASUREMENT OF GASOLENE.

1,338,814.  Specification of Letters Patent.  Patented May 4, 1920.

Application filed July 19, 1918. Serial No. 245,636.

*To all whom it may concern:*

Be it known that I, GEORGE F. CLAMER, a citizen of the United States, residing at Collegeville, in the county of Montgomery and State of Pennsylvania, have invented certain new and useful Electric Systems for Storage and Measurement of Gasolene, of which the following is a specification.

My invention relates to a pump for gasolene of the general character placed at the curb for supplying automobiles and known as a curb pump.

The purpose of my invention is to insure reliable and accurate measurement of a readily vaporizable liquid, particularly avoiding initial short measure.

A further purpose is to provide a by-pass for preliminary pumping, insuring full density of the gasolene when directed through the meter.

A further purpose is to shut off the meter from the preliminary path of the gasolene as the flow begins and to pass through the meter a subsequent part of the flow only to be measured.

A further purpose is to pump the oil through a by-pass against a pressure, insuring the maintenance of good liquid body before directing the liquid through the meter.

A further purpose is to provide a motor-operated pump with relief against danger from over pumping, permitting it to be started before the gasolene is measured and run subsequently thereto, without interfering with the measurement.

A further purpose is to pump the oil through a complete circuit with return against a pressure and after the circulation is well established to tap this circulation through a meter for the supply of the liquid required.

Further purposes will appear in the specification and in the claims.

I prefer to illustrate my invention by but one form thereof, among the various forms in which the invention may be applied, selecting one which in use has proved to be practical, efficient and thoroughly reliable and which at the same time well illustrates the principles of my invention.

Figure 1 is a front elevation of this preferred form of my invention.

Fig. 2 is a section of the structure of Fig. 1 upon line 2—2 thereof with the hose in a different position and showing additional parts.

In the drawings similar numerals indicate like parts.

My invention resides both in the process and in apparatus by which the process may be carried out.

My invention is applied practically to the ready delivery of light oils, as, for example, the furnishing of gasolene to automobiles, motor cycles and local trade, usually provided for by a convenient pump, frequently referred to as a curb pump.

Though the main purpose of my invention is to avoid short measurement which has arisen in many cases from measuring vaporized oil as if it were oil itself, and is most applicable at the present time to the measurement of gasolene, I shall treat the liquid handled generally herein as oil, for convenience and by way of illustration, recognizing the general applicability of my invention to all light oils and of some parts of my invention to heavier liquids, not necessarily oil, as well.

In the most prevalent type of pump now in use, the oil is measured by the cylinder of a piston pump; upon the assumption that the vacuum conditions created by lifting the piston will result in full flow of oil to fill the entire space below the piston.

The above assumption is not always justified, particularly in the case of the first filling of the cylinder after an interval in use of the pump, as is the case in the morning, or after the main storage tank has been filled; as the oil drains out of the connecting pipes sufficiently so that the pipes are partly filled with vapor. The cylinder is sometimes half filled with vapor at the first stroke.

Attempts have been made to improve this situation by the use of check valves; but these have not been sufficiently tight for the purpose and the authorities in different parts of the country have condemned and sealed these pumps, because of the short measure which they were delivering.

My invention is directed primarily to the protection against short measure and secondarily toward making it possible to apply a power pump instead of the hand pumps now in general use.

I show a storage tank 1, for any suitable oil to be pumped such as at 2 and provided with the usual filling pipe 3 and cap or cover 4. These may be located at a distance from the pump.

At a point convenient for the delivery of the oil, I provide a pump casing 5 shown as inclosing brackets 6 and 7 for the convenient support of the mechanism therein, which brackets may form partitions as indicated if desired. The casing is preferably vented by openings which I have not considered it necessary to show, located just above the partitions, and the partitions restrict the fall of any gas or vapor which may accumulate without entirely preventing it.

For convenience I have shown the tank 1 as vented through the casing 5 by a connecting pipe 8 with fire arresting screen 8″, which at the same time provides drainage into the tank for any oil which breakage of the pipes or loosening of the joints might permit to flow into the casing.

The casing is surmounted by a neck 9 inclosing part of the piping for the oil discharge and supporting the usual illuminated globe 10.

As I prefer to use an electric pump, I show tubing 11 for any suitable electric supply here shown as a three wire system, operating an electric motor 12 from one side, controlled through switch 13, and display lamp 14 from the other side controlled by switch 15. The separation of the lamp and motor to place them upon different sides of the system permits independent fuse provision for the two sides. Obviously the character of the supply does not affect my invention and the electric motor is here typical of a power motor in its most convenient form.

The motor is connected in any suitable manner with a pump 16. Because I show both the motor and the pump as horizontally placed and prefer bevel gear connections. I have illustrated the motor shaft 17 as connected by bevel gears 18 to a shaft 19. This is supported in bearing 20 and its lower end passes through a bearing 21 to one of two bevel gears 22 by which it is connected to the pump shaft 23. The rotary pump 16 receives inlet oil at 24 and discharges at 25. The pump inlet is connected by pipe 26 with the oil supply. The pipe is provided with the usual foot valve 26′.

In order that the pump may be started to give oil circulation in my pumping system preparatory to the metering operation and may continue to pump with entire safety subsequently thereto, I connect the pump discharge with a complete return oil circuit which is illustrated in Fig. 2 as passing upwardly through filter 27 and pipe 28 across by connection 29 and downwardly by pipes 30 and 31 to rejoin the oil supply either in the T, surrounding suction pipe as shown or into the tank. This prevents all danger of over pumping and enables me to have a supply of freshly pumped oil in this system prior to the metering operation.

As I particularly desire to avoid vapor in this return system, or at least in the greater part of it, I place a pressure valve 32 in the return pipe, thus insuring maintenance of oil supply throughout the return system back of the valve and freedom from drainage of this portion of the return leg of this circulatory system at all times. The pressure can be made adjustable if desired, but this will not ordinarily be required, as the back pressure desirable for any intended oil will be substantially the same for all pumps of this character handling it. I have found a back pressure of from 4 to 6 pounds quite desirable but have no intention of restricting myself in any way to this pressure in any of my claims which include the pressure valve.

As will be clear, the valve may be placed as near to the tank level as the judgment of the designer indicates, to maintain the liquid in all or any intended part of this return pipe. My experience has shown me that it is not necessary to place all of the return pipe under pressure.

I tap this circulartory system back of the pressure valve and pass the oil obtained through a meter to supply the customer. I am thus able to insure the filling of the system with fresh oil by operation of the pump before I open the passage through the meter and to secure a solid body of freshly pumped oil for the meter. In order to additionally protect against possibility of vapor momentarily in the system, which in that event would lie in the highest part of the circulatory system, I prefer to tap the system at some point 33 below the connection 29 and pass the oil through the meter 34 by connection 35. This tap is controlled by a hand valve 36 which can be positively closed to protect against leakage of gas or oil.

The oil which is passed through the meter is discharged through an outlet pipe 37 and a hose 38. The hose may have a plain end as at 39 in Fig. 1 or be provided with spigot 40 as in Fig. 2. As it is customary to form the hose connection with some point in the outlet high enough to drain the entire hose at each tank filling, it is not ordinarily necessary to provide the spigot; and its function would be confined to saving the hose content of gasolene where the tank was already full so that drainage of the hose was not desirable. I have shown a hand-operated vent 43 at the top of the hose to facilitate its drainage.

In operation the hose is connected with the tank to be filled and the pump is started while the valve 36 remains closed. When the pump has operated for a short time to insure the filling of the circulating system anew with oil the valve 36 is opened and is allowed to remain open until the meter registers the desired quantity of oil, when the hand valve 36 is closed and the hose is drained into the tank. The oil may be passed through the meter slowly or rapidly as preferred, according to the valve opening given. This speed may be nicely adjusted, as the limit of intended purchase is approached. The only effect which closing the valve 36 has upon the circulatory system is to require that additional oil pass through the pressure valve. Where the valve 36 is but partially opened there will be some flow through the pressure valve all the time that the pump is operated.

Even if the pump is not started until after the hand valve 36 is opened, there is no danger of short measure to the consumer as the circulatory system permits the air and vapor to pass beyond (above) the connection by which the meter is branched off. One highly important advantage in this invention lies in the ability always to reprime the pump without giving a false measurement or wasting or exposing gasolene.

The type of meter used makes it convenient also to indicate the price as well as the quantity by the position of the hand upon the dial.

It will be evident that the return circuit constitutes a main circuit from which the meter tap operates as a branch and that the pressure in the main circuit, whether this pressure is obtained by restriction of the passage to a smaller cross section than that conveniently handled by the pump, by lifting the fluid to provide a head, by pressure valve or any other of the equivalents which will occur to those skilled in the fluid-handling art, is advantageous both in restraining vaporization of the liquid and in causing the liquid to flow through the meter branch.

The first turn of the pump will cause pressure in this section of the circulatory system, even if no pressure has previously existed there. As the pressure of the atmosphere upon the surface of the liquid in the tank causes the liquid pumped to follow up into the pump as fast as the pump handles it, the situation at the end of the pumping action (since the pump is operated against the pressure after the tap to the meter has been closed) will be one of pressure in the pipe between the pump and the pressure valve and a liquid column without pressure between the pump and the foot (check) valve at the bottom of the suction line. Though the foot valve (check valve) will not hold for long periods of time and cannot therefore be relied upon to make a pump operative in delivery of liquid free from vapor to a meter, for short periods of time, between operations in a busy meter, it will hold sufficiently to maintain a liquid column and, to hold some pressure because any pressure transmitted to this suction line from the circulatory system above the pump will tend to seat the foot valve (check valve) much more reliably than this valve would be seated if it had the pressure of the column of liquid above it alone to cause seating of the valve.

Having thus described my invention, what I claim as new and desire to secure by Letters Patent, is:

1. The method of pumping and measuring liquids which consists in passing the liquid through a main circuit, returning it to the tank free from the intake and passing part of the liquid through a branch circuit diverging from the main circuit below the top level of the latter and containing a meter for the purpose of measuring liquid.

2. The method of pumping and measuring liquids which consists in pumping the liquid through a meter and concurrently providing a by-pass raised above the point at which it diverges from the path to the meter to provide for passage of gas to this portion and then extending downwardly to the fluid supply free from the intake.

3. The method of pumping and measuring liquids which consists in passing the liquid through a main circuit against sufficient resistance to create a pressure, and passing part of the liquid through a branch circuit diverging from the main circuit below the top level of the latter and containing a meter for the purpose of measuring the liquid.

4. The method of metering and pumping light weight oils subject to free vaporization which consists in operating a pump through a circulatory system to insure a body of oil free from vapor in the system and subsequently tapping the circulatory system through a meter to deliver the measured quantity of oil.

5. The method of pumping and measuring oil which consists in pumping the oil through a circulatory system, to insure a body of oil free from vapor in the system, connecting the system with a meter to deliver the required quantity of oil, closing the connection with the meter and subsequently stopping the pump.

6. The method of pumping and measuring oil for delivery which consists in initially pumping the oil through a circulatory system against a resistance and subsequently connecting the system with a meter while continuing the pumping operation to deliver the required amount of oil.

7. The method of pumping and measuring oil for delivery which consists in initially pumping the oil through a circulatory system against a resistance and subsequently connecting the system with a meter while continuing the pumping operation to deliver the required amount of oil, in closing off the connection between the system and the meter and subsequently stopping the pumping action.

8. The method of pumping and metering light oils which consists in pumping the oil through a return system while maintaining it under moderate pressure, in tapping the system through a meter to withdraw the oil measured while maintaining the pumping operation, in closing the connection between the meter and system and in maintaining the system full of fluid in preparation for the next pumping and measuring operation.

9. In a metering system, a pump, a circulatory system supplied therefrom and having a portion thereof elevated with respect to the return, and a meter connected with the circulatory system between the pump and elevated portion.

10. In a meter for liquids, a pump, a continuous circulatory system fed therefrom, a meter branched from the system and a valve normally closing the meter branch.

11. In a light-oil meter and pump, a pump, a complete circulatory system supplied by said pump, a pressure valve in the return of said system and a meter and connections for discharge of the oil therefrom, connected to the system between the pump and pressure valve.

12. In a light-oil meter and pump, a pump, a complete circulatory system for the oil pumped having part of the system of higher lever than the remainder, a pressure valve in the system beyond this higher portion in the direction in which the oil is pumped, a meter, a connection from the system to the meter between the pump and this higher portion and discharge connections from the meter for supplying the customer.

13. In a light-oil meter and pump, a pump, a complete circulatory system connected with the pump having a portion of the same elevated with respect to the return thereof, a pressure valve in the return of the system, a meter connected to the system between the pump and the elevated portion, a valve controlling the flow from the system to the meter and discharge piping from the meter.

14. In a light-oil meter and pump, a pump, an upwardly extending pipe therefrom, a return pipe and connections completing a circulatory system for the pump, a ressure valve in the return pipe, a meter connected with the upwardly extending pipe short of the highest point thereof, discharge connections for the meter and a hand valve in the meter connection controlling admission of the oil to the meter.

15. In a light-oil meter and pump, a motor-operated pump, a circulatory system fed therefrom, a pressure valve in the system, a meter, a normally closed connection between the meter and the system located between the pump and valve and means for opening the connection.

16. In a light-oil meter and pump, a pump, a circulatory system connected therewith, and having parts at different levels, a pressure valve in the system, a meter connected with the system below the highest part thereof, a discharge for the meter extending above the level of the meter and a hand valve controlling the connection of the meter with the system.

17. In a light-oil meter and pump, a rotary pump, an electric motor connected therewith, a circulatory system connected with the motor comprising an upwardly extending pipe, downwardly extending return and a connection therewith at the top, a pressure valve in the return, a meter connected with the system at or near the top thereof, a hand valve controlling the connection with the meter and a discharge from the meter extending upwardly to a point above the level of the meter.

18. In a meter for liquids, a pump, a continuous circulatory system fed therefrom, having the return free from the intake and a meter circuit branched from the system below the top level of the system.

GEORGE F. CLAMER.